United States Patent
Malhi

[11] Patent Number: 5,933,320
[45] Date of Patent: Aug. 3, 1999

[54] COMPUTER HAVING A COLLAPSIBLE KEYBOARD STRUCTURE

[75] Inventor: Satwinder Malhi, Garland, Tex.

[73] Assignee: Texas Instruments Incorporated, Dallas, Tex.

[21] Appl. No.: 08/771,178

[22] Filed: Dec. 20, 1996

Related U.S. Application Data

[60] Provisional application No. 60/009,194, Dec. 22, 1995.
[51] Int. Cl.[6] .............................. G06F 1/16; H01H 13/14
[52] U.S. Cl. ............................................ 361/680; 200/341
[58] Field of Search ........................... 364/708.1; 341/22; 361/680; 200/5 A, 341, 344, 345, 513

[56] References Cited

U.S. PATENT DOCUMENTS

| | | | |
|---|---|---|---|
| 5,163,765 | 11/1992 | Levy | 200/5 A X |
| 5,187,644 | 2/1993 | Crisan | 361/680 |
| 5,459,461 | 10/1995 | Crowley et al. | 341/22 |
| 5,519,569 | 5/1996 | Sellers | 361/680 |

*Primary Examiner*—Lynn D. Feild
*Attorney, Agent, or Firm*—Ronald O. Neerings; Richard L. Donaldson

[57] ABSTRACT

A notebook computer (10) including a keyboard (14) having gas or piston expandable keys (18) which may be placed in an expanded or compressed state. While in an expanded state, the keys (18) are approximately the size of the keys on a standard keyboard. While in a compressed state, the keys are essentially flat, allowing the keyboard to be folded upon itself. Accordingly, the keyboard (18) may be folded in a compressed state when the computer is not in use to reduce keyboard area, and unfolded and expanded to provide a full size keyboard when the computer is in use.

12 Claims, 5 Drawing Sheets

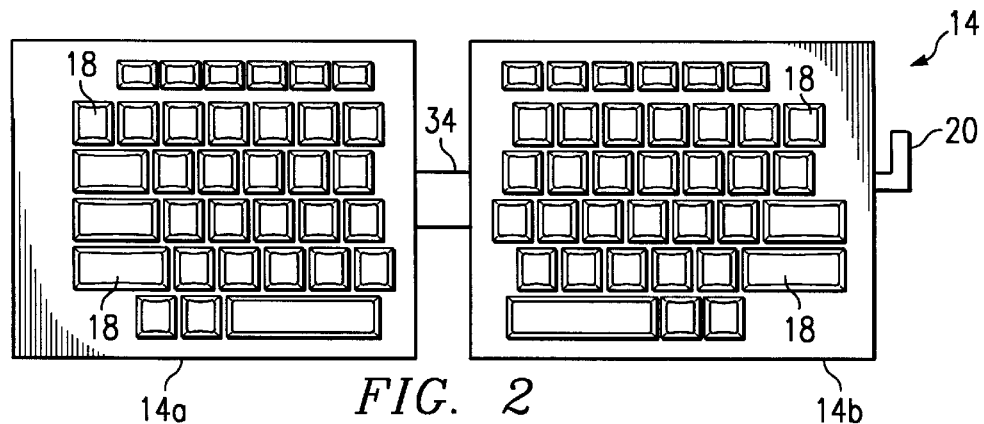
FIG. 2
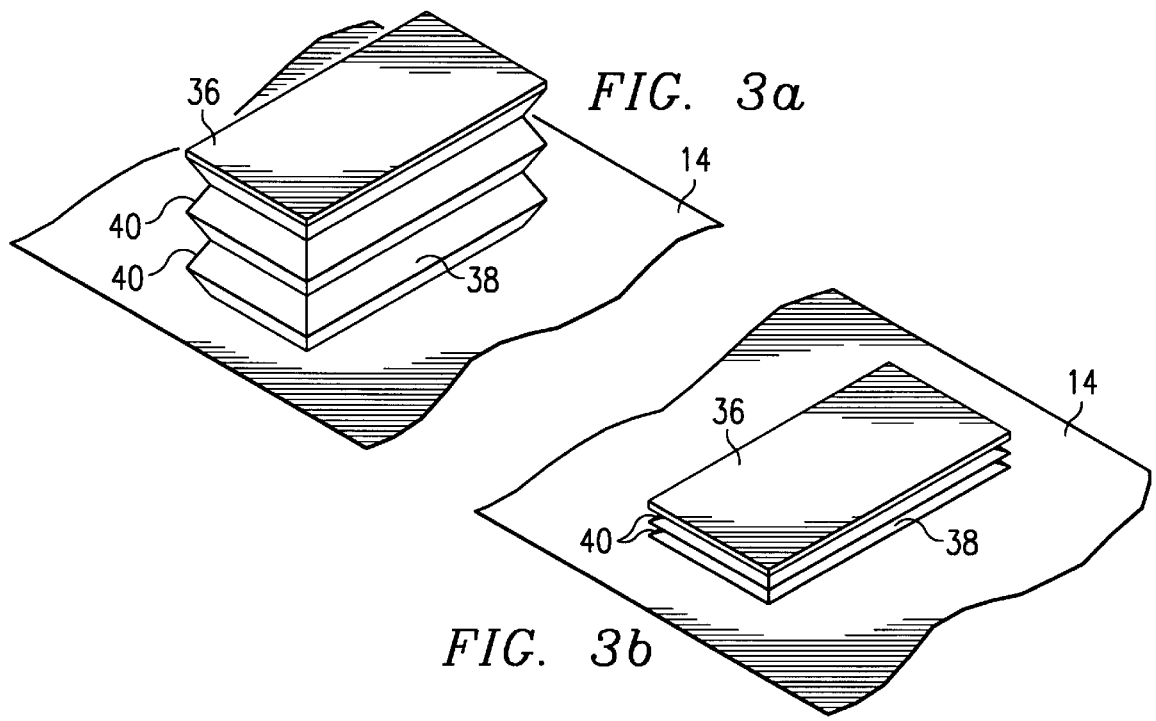
FIG. 3a
FIG. 3b
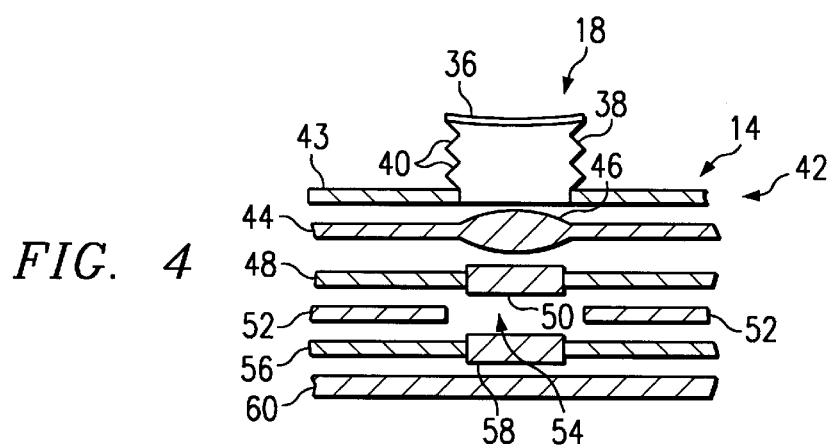
FIG. 4

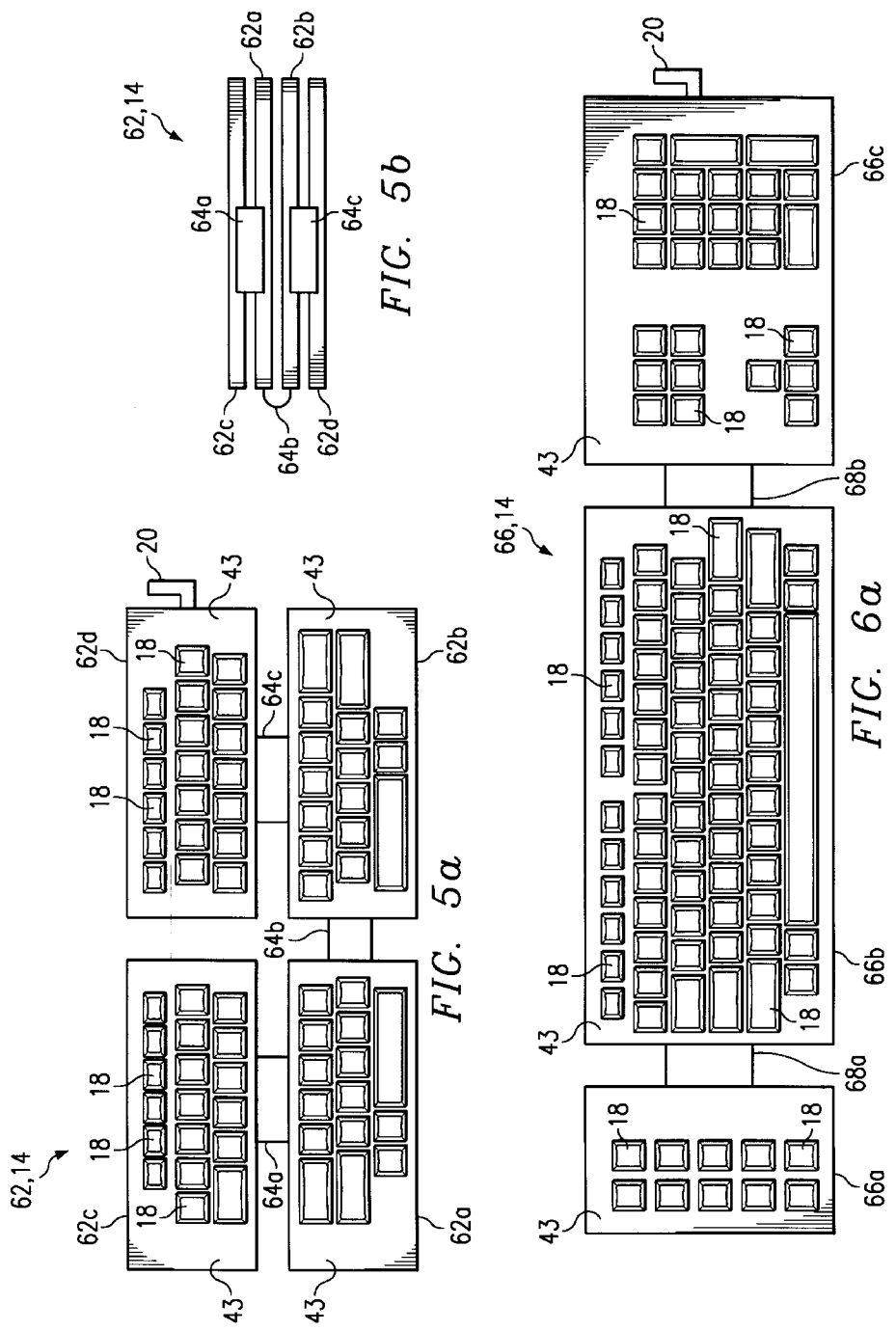

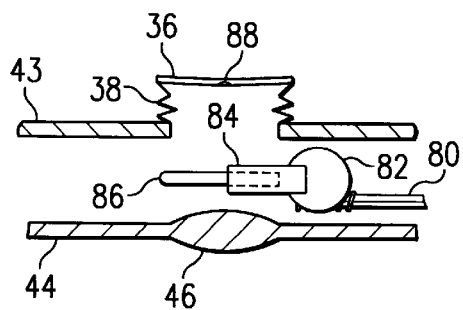
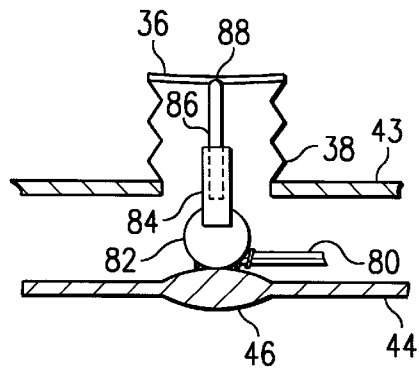
FIG. 9a   FIG. 9b
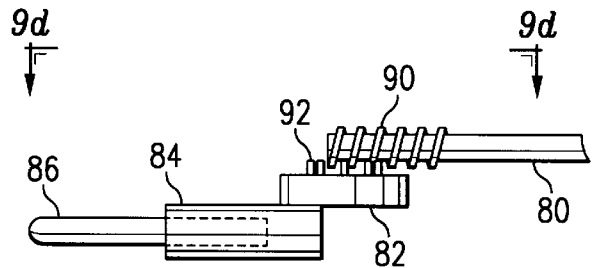
FIG. 9c
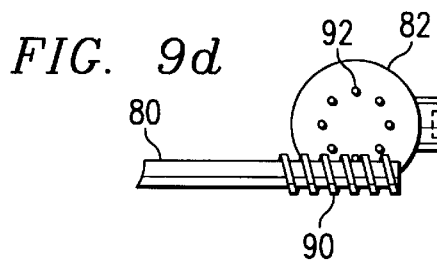
FIG. 9d
FIG. 10a
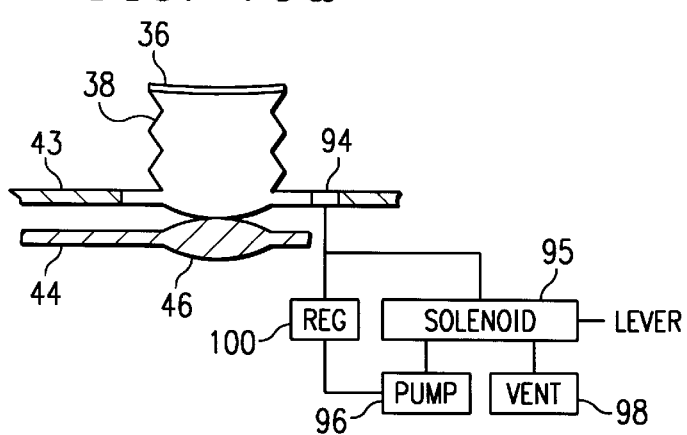
FIG. 10b
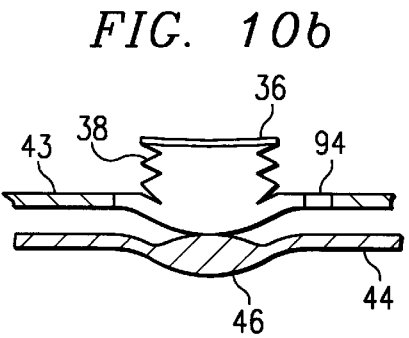

COMPUTER HAVING A COLLAPSIBLE KEYBOARD STRUCTURE

This application claims priority under 35 USC § 119 (e)(1) of provisional application number 60/009,194, filed Dec. 22, 1995.

TECHNICAL FIELD OF THE INVENTION

This invention relates in general to input devices and, more particularly, to a low profile keyboard.

DESCRIPTION OF RELATED ART

Portable computers, other than some pen-based computers, use a keyboard to receive input from a user. Because of the portable nature of a processing device, it may be desirable to have a large number of keys on the keyboard, while maintaining a small keyboard area.

Portable computers are valued in large part by their size and weight. Portable computers of reduced size are easier to carry and pack, and therefore are more desirable to users. Reducing the overall size of a portable computer, however, often forces compromises in keyboard design, due to the need to fit a large number of keys in a small area. In order to fit a large number of keys into a small area, the keys are generally arranged differently than on a normal computer keyboard, in order to eliminate any wasted area. Also, certain keys are used for multiple functions in conjunction with control keys. For example, the character keys at the lower right-hand corner of the keyboard can be used for both characters and, by pressing down a special control key similar to a shift key, cursor control. Commonly, the numeric pad found on most keyboards is overlaid with character keys on portable computer keyboards.

Such keyboards are disfavored by many users, since most computer users are used to the arrangement and size of the keys on a normal computer keyboard. Consequently, when such users are touch typing, their fingers hit the wrong keys, causing much frustration.

A recent attempt to increase the size of a portable keyboard splits the keyboard in two section along a stair-stepped diagonal break. This type of keyboard is used on portable computers from International Business Machines, Inc. When the screen of the portable computer is opened, the keyboard separates and realigns itself along the stair step. While this technique does not increase the surface area of the keyboard, it allows a keyboard to be virtually square while not in use and, when opened, translates the keyboard to a rectangular shape more like a standard keyboard, allowing a more normal layout of keys.

This type of keyboard presents certain problems. First, it is mechanically complicated and, therefore, expensive to fabricate. Second, it is limited in its ability to re-size itself to the full size of a standard keyboard.

Therefore, a need has arisen for a keyboard device which requires a small area but can resize itself to produce a full keyboard layout.

SUMMARY OF THE INVENTION

The keyboard of the present invention comprises a substrate and a plurality of compressible keys disposed on said substrate, each key being able to assume a compressed and an uncompressed state. Circuitry is coupled to said keys for generating signals responsive to said keys being pressed. The keyboard can be folded when the keys are in an compressed state.

The present invention provides significant advantages over the prior art. When the keys are in a compressed state, the profile of the keyboard can be made extremely thin, thereby allowing the substrate to be folded upon itself to reduce area when the device to which it is attached, such as a portable computer, is not in use. In use, the substrate can be unfolded and the keys inflated to provide a large area in which to place keys. This is particularly useful in connection with portable computers where a full size standard keyboard can be implemented, while taking up no more room than a notebook-sized keyboard when compressed and folded.

BREIF DESCRIPTION OF THE DRAWINGS

For a more complete understanding of the present invention, and the advantages thereof, reference is now made to the following descriptions taken in conjunction with the accompanying drawings, in which:

FIG. 2 illustrates a first embodiment of a folding keyboard;

FIGS. 3a and 3b illustrate compressible keys used in the preferred embodiment of FIG. 2;

FIG. 4 illustrates a cross sectional view of the keyboard assembly;

FIGS. 5a and 5b illustrate top and front views of a second embodiment of a folding keyboard;

FIGS. 6a and 6b illustrate top and front views of a third embodiment of a folding keyboard;

FIGS. 9a and 9b illustrate cross sectional side views of a first embodiment of a collapsible key;

FIGS. 9c and 9d illustrate top and side views of a drive mechanism used in the key of FIGS. 9a and 9b; and FIGS. 10a and 10b illustrate cross sectional views of a second embodiment of a collapsible key.

DETAILED DESCRIPTION OF THE PREFERRED EMBODIMENT

The present invention is best understood in relation to FIGS. 1–10 of the drawings, like numerals being used for like elements of the various drawings.

Figure 1A:
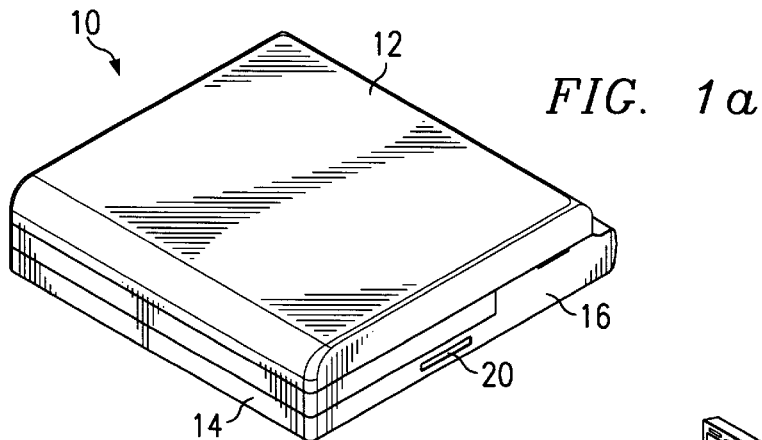
FIGS. 1a and 1b illustrate a perspective views of a notebook computer in a inactive (closed) state and an active (open) state, respectively.
Figure 1B:
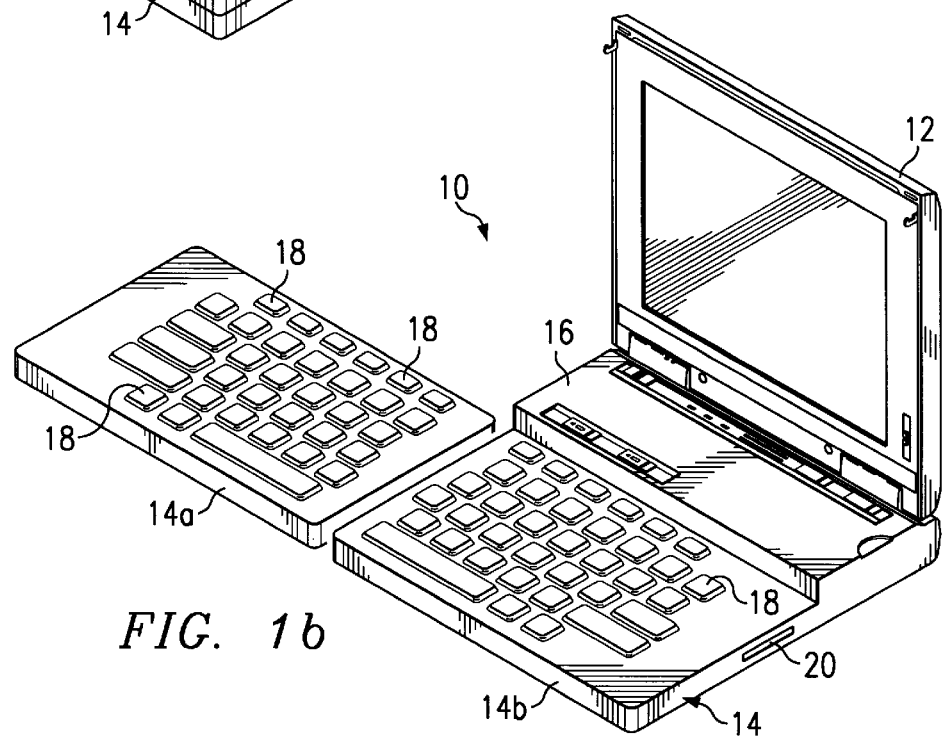

FIG. 1a illustrates a perspective view of a portable ("notebook") computer 10 in a closed configuration with the display 12 secured to a folding keyboard assembly 14 and computer electronics assembly 16. In FIG. 1b, the notebook computer 10 is in an open configuration, with the display 12 separated from the folding keyboard assembly 14. In the embodiment of FIG. 1b, the keyboard assembly 14 is in an active state, with the keyboard having keyboard sections 14a and 14b unfolded and keys 18 exposed. Lever 20 is disposed on the side of keyboard assembly 14 to activate keys 18, as described in greater detail below. It should be noted that the folding arrangement and key arrangement of the keyboard assembly make take many forms, as shown in greater detail hereinbelow.

Figure 1C:
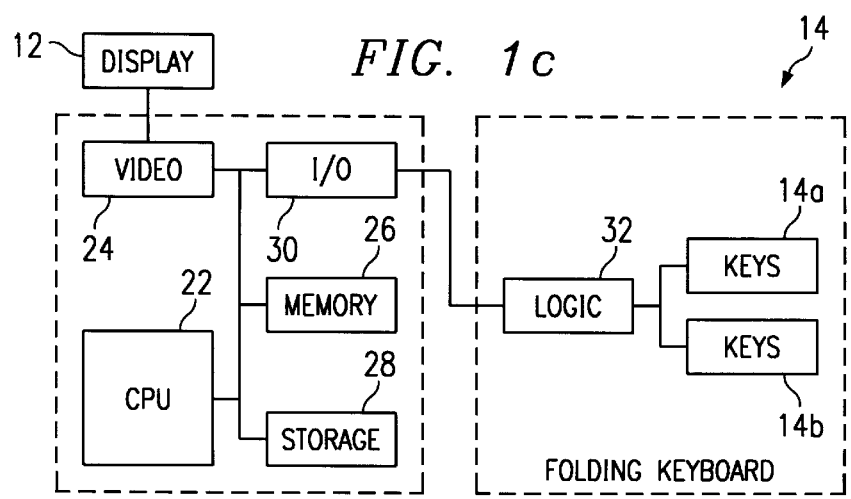
FIG. 1c illustrates a block diagram of the notebook computer of FIGS. 1a and 1b.

FIG. 1c shows a basic block diagram of the notebook computer 10. The computer electronics assembly include the processing circuitry 22 coupled to video circuitry 24 coupled to display 12, semiconductor memory 26, mass storage units 28 (such as floppy drives, hard drives and optical disks),and input/output (I/O) circuitry 30. I/O circuitry may include, for example, PCMCIA ports, serial ports, parallel ports and the keyboard interface. It should be noted that some of the computer electronics may be housed along with the display 12. Additionally, a battery (not shown) is typically used to power the computer electronics and display; the battery may be coupled to either the display housing or the computer electronics housing 16.

Keyboard assembly 14 comprises logic 32 for decoding which key or keys are pressed by a user. The keys 18 are divided into sections 14a and 14b (as shown in additional embodiments herein, the keyboard 14 may be divided into a greater number of sections). Keyboard logic 32 is coupled to sections 14a and 14b. When a user presses a key, the logic electronically determines which key was pressed and sends the information to the computer electronics 16.

In the preferred embodiment, the keyboard assembly 14, as described in greater detail below, has compressible keys, which allow the keyboard assembly 14 to be stored in an extremely low profile state. When the keys of the keyboard 14 are in a compressed state, the keyboard may be folded upon itself to reduce the footprint of the keyboard while the notebook computer 10 is closed. When the notebook computer is opened, the keyboard assembly 14 is unfolded and the keys expanded to provide a keyboard having dimensions significantly larger than normal.

FIG. 2 illustrates a top view of a first keyboard configuration where the keyboard assembly 14 can be folded laterally in the middle of the keyboard. The keyboard assembly 14 shown in FIG. 2 has two sections 14a and 14b, each section including a plurality of keys 18. Keys 18 may be placed in a compressed or uncompressed state by lever 20. Sections 14a and 14b are electrically coupled by connector 34, such as a flexible multi-conductor cable.

In FIG. 2, the keys 18 are arranged in a standard split key arrangement used by keyboards which separate keys for the user's right and left hands, which is believed to relieve Carpal's Syndrome in some cases. Cable 34 can be expanded to allow greater separation of sections 14a–b. The arrangement of keys, however, may be done in any fashion desired by the keyboard designer. As can be seen in FIG. 2, in addition to the standard keys, the right and left sections 14a and 14b of the keyboard assembly 14 have sufficient room for additional keys.

In operation, the keyboard assembly 14 is placed in an active state by unfolding the sections 14a and 14b and moving the lever 20 to place the keys 18 in an uncompressed state. To place the keyboard in an inactive state for storage and travel, the lever 20 is moved to place the keys 18 in a compressed state and the keyboard is folded to the position shown in FIGS. 1a and 1b. The keyboard assembly 14 and display 12 can then be secured together.

Because the keys 18 can be placed in a compressed or uncompressed state, the keyboard can have keys with a normal height and feel during operation and transform to a low profile keyboard during storage to reduce the thickness of the notebook computer. Further, the low profile of the keyboard assembly 14 in the inactive state allows the keyboard to be folded for storage without adding significant thickness to the notebook computer's height.

FIGS. 3a and 3b illustrate side views of a preferred embodiment of the exterior of a key which may maintain a compressed or uncompressed state. The key 18 has a top portion 36, which is typically formed of a hard material, similar in shape and feel to the top of a normal keyboard key. The sides 38 are formed of a flexible material which has the shape of a bellows; for example, sides 38 can be formed from a polymer material.

In operation, the key 18 is expanded while the keyboard assembly 14 is in an active state. Expansion may be performed by mechanical means, as described below, or by other means, such as by inflating the interior of the key 18 with air (or another gas), using the lever 20 as the arm of a pump. While in the expanded state, the key acquires the general size and feel of a standard keyboard key. When the lever moved to place the key in a compressed state, the sides 38 collapse along folds 40.

FIG. 4 illustrates an exploded view of a preferred embodiment of the keyboard assembly 14. The operational portion of the keyboard assembly 14 comprises six layers. The first layer is the key layer 42. The key layer 42 comprises the keys 18, in any desired configuration along substrate 43. The keys 18 may be pressed down, and return to their original position. Below the key layer 42 is a membrane layer 44, typically formed of a rubber or similar material, having bumps 46 formed below each key 18. Underneath the membrane layer 44 is a first printed wiring board (PWB) 48, which has a contact 50 disposed beneath each bump 46. Below the first PWB 48 is a spacer layer 52, which is a thin plastic layer which has holes 54 disposed below each contact 50. Below the spacer layer 52 is the second PWB 56, which has contacts 58 corresponding to contacts 50. A backplane 60 is disposed beneath second PWB 56. For illustration purposes, the dimensions of the various layers are not shown to scale.

When a key is pressed, the corresponding bump 46 of the membrane layer 44 is pushed downward, causing contacts 58 and 50 to touch. Wiring on PWBs 48 and 56 is connected to the logic 32 and to the contacts 58 and 50, which can detect the electrical connection between contacts 58 and 50. The logic 32 sends a scan code to the computer electronics 16 indicating which key was pressed.

FIG. 5a illustrates a top view of a keyboard assembly 62 in an active state and FIG. 5b illustrates a front view of the second embodiment of the keyboard in a folded state. Keyboard assembly 62 can be used as an alternative embodiment for keyboard assembly 14 shown in FIGS. 1a–b. In FIGS. 5a and 5b, the keyboard assembly 62 has four sections, individually referenced as sections 62a–d, which are coupled to one another by connectors 64a–c. In the preferred embodiment, keyboard 62 also uses compressible keys 18.

In operation, the keyboard 62 may be folded (after placing the keys 18 in a compressed state) by folding sections 62a and 62b over sections 62c and 62d, respectively, and then folding sections 62a and 62c over sections 62b and 62d. This folding arrangement assumes that section 62d is coupled to the housing 16 of the computer 10. Naturally, by alternative placement of connectors 64a–c, the keyboard could be first folded about a vertical axis and then about a horizontal axis, as would be clear to one skilled in the art.

The arrangement of keyboard 62 is advantageous in certain situations, since it provides a smaller footprint while in a folded state than the keyboard shown in FIG. 2, while allowing a similar, or greater, vertical dimension.

Figure 6B:
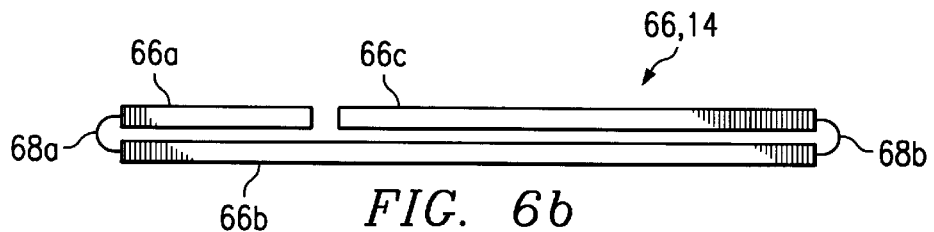

FIG. 6a illustrates a top view of a keyboard assembly 66 in an active state and FIG. 6b illustrates a front view of keyboard assembly 66 in a folded state. Keyboard assembly 66 can be used as an alternative embodiment for keyboard assembly 14 shown in FIGS. 1a–b. In FIGS. 6a and 6b, the keyboard assembly 66 has three sections, individually referenced as sections 66a–c, which are coupled to one another by connectors 68a–b. In the preferred embodiment, keyboard 66 also uses compressible keys 18.

In FIG. 6a, it can be seen that the standard typing keys are on section 66b, while the editing keys (left, right, up and down cursor keys and insert, delete, home, end, page up and page down keys) and the numeric keypad (0–9 and mathematical operation keys) are placed on section 66c. Special function keys, or user programmable keys, may be placed on section 66a. Alternatively, the editing keys could be placed on section 66a and the numeric keypad placed on section 66c.

While section 66c is approximately twice the size of section 66a in the illustrated embodiment of FIG. 6a, the footprint sizes of an actual keyboard could be set as desired by the designer, depending upon the keyboard layout.

The keyboard 66 of FIG. 6a has the advantage that all keys 18 may be placed in locations familiar to a touch typist, along with additional keys not normally found on a standard keyboard. If desired, section 66b could also be split to allow separation of the right and left hand character keys for ergonomic positioning, similar to the keyboard 14 of FIG. 2.

As shown in FIG. 6b, section 66a and 66c are folded over section 66b to place the keyboard in an inactive state after compressing the keys 18.

Figure 7A:
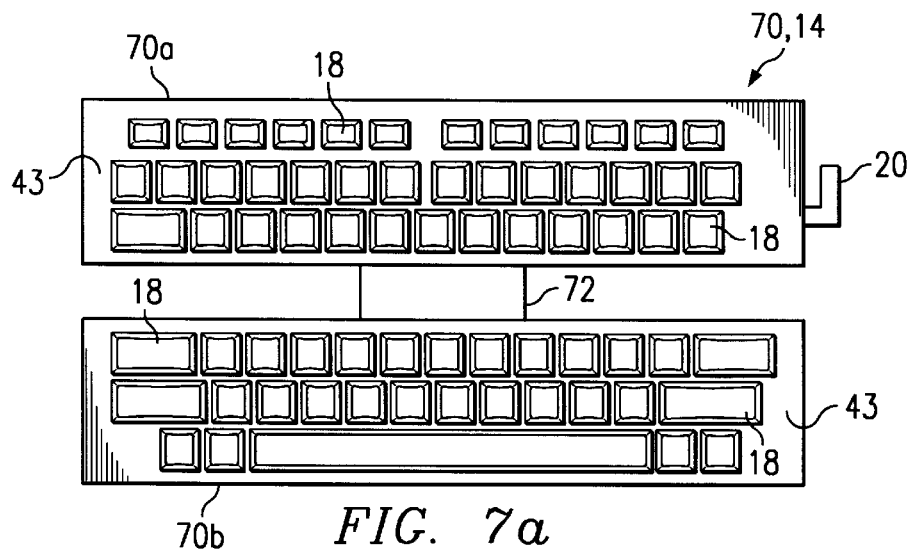
FIGS. 7a and 7b illustrate top and side views of a fourth embodiment of a folding keyboard.
Figure 7B:
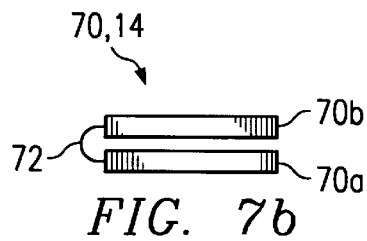

FIG. 7a illustrates a top view of a keyboard assembly 70 in an active state and FIG. 7b illustrates a side view of keyboard assembly 70 in a folded state. Keyboard assembly 70 can be used as an alternative embodiment for keyboard assembly 14 shown in FIGS. 1a–b. In FIGS. 7a and 7b, the keyboard assembly 70 has two sections, individually referenced as top section 70a and bottom section 70b, which are coupled to one another by connectors 72. In the preferred embodiment, keyboard 70 also uses compressible keys 18.

The top section 70a houses the top three rows of keys while the bottom section 70b houses the bottom three rows of keys. Accordingly, the entire set of keys can be stored in an area having a width of approximately one-half of a standard keyboard. This allows for a larger area to be dedicated to the computer electronics 16.

As shown in FIG. 7b, the bottom section 70b is folded over top section 70a, after compressing the keys, in order to place the keyboard in an inactive position for storage.

Figure 8:
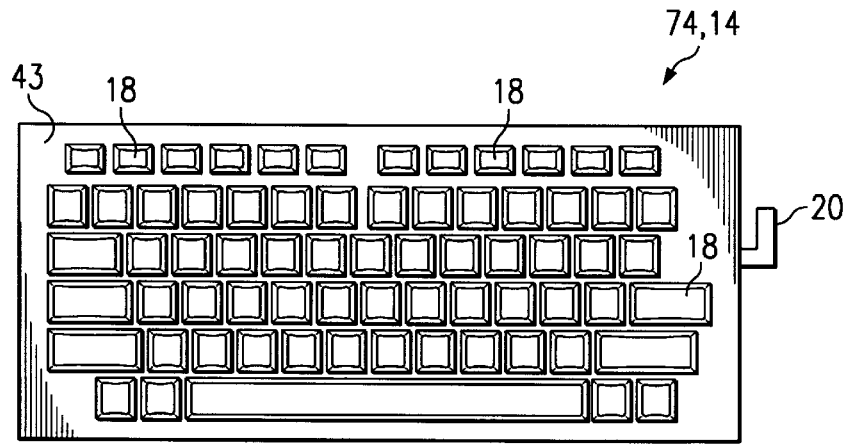
FIG. 8 illustrates a top view of a keyboard with collapsible keys.

FIG. 8 illustrates a top view of a keyboard assembly 74 with a single keyboard section. While keyboard 70 does not fold, it uses compressible keys 18 which allow the profile to be very thin. Accordingly, the computer 10 will be thinner in the inactive state than with conventional notebook keyboards, while providing normal-size keys during use.

FIGS. 9a–d illustrate an embodiment of a mechanism which can be used to expand and collapse the compressible keys 18. Linkage 80 is coupled to lever 20. The end of linkage 80 is coupled to pivot 82, such that pivot 82 will rotate and move forward responsive to movement of lever 20, as shown in FIG. 9b. Pivot 82 is coupled to arm 84, in which spring-loaded piston 86 is disposed.

When in a inactive (compressed) position, arm 84 and piston 86 are positioned in a lateral plane, such that sides 38 are allowed to compress for storage. When lever 20 is rotated to an active (expanded) position, linkage 80 pushes pivot 82 forward as arm 84 is rotated upward to mate piston 86 with indent 88 in top portion 36 of key 18.

When in an active position, piston 86 may be pushed downward through arm 84 responsive to a user pressing down on top portion 36. As piston 86 is pushed downward, it contacts bump 46 on membrane 44, which initiates the recognition of a keystroke by logic 32, as described in connection with FIG. 4.

Piston 86 is spring-loaded within arm 84 to return the piston to a normal position once the user releases the key. Other mechanisms for providing a tactile response to the key can also be used.

FIGS. 9c and 9d illustrate an embodiment for rotating the pivot 82 responsive to rotation of linkage 80. In this embodiment, linkage 80 has a screw end 90 which cooperates with spokes 92 disposes around the perimeter of pivot 82. As linkage 80 is rotated, the spokes 92 are moved forward, causing pivot 82 to rotate.

FIGS. 10a–b illustrate an embodiment of key 18 where the key is expanded and contracted by pumping air into and out of the interior of the keys. In this embodiment, the sides 38 of keys 18 have valves 94 through which air can pass into or out of the key, which is otherwise sealed. A solenoid 95 selectively couples the valve 94 to either a pump 96 or vent 98, responsive to lever 20. A regulator 100 controls the pump 96, such that the inflation of the key 18 stops once a predetermined pressure is reached. The regulator 100 can also restart the pump is pressure drops below a certain level.

As air is passed into the key 18, it is inflated, and the bellows formed by sides 38 expands. As air is passed out of the keys 18, the bellows formed by sides 38 contracts.

In an alternative embodiment, air pressure could be supplied by a pump mechanism internal to the keyboard assembly using lever 20 as the pump arm. Similarly, the pump mechanism and lever 20 could be used to deflate the keys 18.

When in an expanded state, the bottom of the key 18 is proximate the top of bump 46 of membrane 44. When pressed downward by a user, the bottom of the key 18 pushes bump 46 downward to initiate a keystroke. Mechanisms used in conventional keyboards to provide a tactile response, such as rubber cups coupled to the bottom of the key could also be used with this embodiment.

Depending upon how the expansion and compression of the keys 18 is implemented, it may be necessary to either provide a separate lever 20 for each section, or to electronically activate the expansion and compression mechanism for each section responsive to movement of the lever 20.

It should be noted that while specific key layouts have been shown herein, the preferred embodiments illustrated could have many different key layouts, as determined by the keyboard designer. Also, other methods of forming the compressible keys could be used, as would be known to one skilled in the art.

Although this Detailed Description of the invention has been directed to certain exemplary embodiments, various modifications of these embodiments, as well as alternative embodiments, will be suggested to those skilled in the art.

The invention encompasses any modifications or alternative embodiments that fall within the scope of the Claims.

What is claimed is:

1. A computer, comprising:
   a processor;
   memory coupled to said processor; and
   a keyboard coupled to said processor comprising:
   a substrate;
   a plurality of inflatable keys disposed on said substrate, each key being able to assume an expanded or inflated state and a compressed or non-inflated state;
   a membrane layer beneath said plurality of keys, said membrane layer having a bump adjacent each key;

a first printed wiring board beneath said membrane layer, said first printed wiring board having a contact adjacent each bump;

a spaced layer beneath said first printed wiring board, said spaced layer having an opening adjacent each contact;

a second printed wiring board beneath said spaced layer, said second wiring board having a contact adjacent each opening; and circuitry coupled to said keyboard for generating signals responsive to said keys being pressed.

2. The computer of claim 1, wherein said substrate comprises two substrate sections.

3. The computer of claim 2, wherein said substrate comprises a first section including keys to be operated by a right hand of a user and a second section including keys to be operated by a left hand of the user.

4. The computer of claim 1, wherein said keys has a top portion formed of a hard material and side surfaces formed of a flexible material.

5. The computer of claim 4, wherein said flexible material is a polymer material.

6. The computer of claim 5, wherein said flexible material is formed in the shape of a bellows.

7. The computer of claim 1, where a gas is used to inflate said inflatable keys.

8. The computer of claim 7, wherein each key has a valve through which said gas can pass into and out of said key.

9. The computer of claim 7, wherein said gas is air.

10. The computer of claim 1, wherein a pumping mechanism is used to inflate and deflate each key.

11. The computer of claim 10, wherein said pumping mechanism comprises a solenoid selectively coupling a valve to one of a pump and a vent.

12. The computer of claim 11, further including a regulator coupling said pump to said keys.

* * * * *